(12) United States Patent
Chai et al.

(10) Patent No.: US 10,332,693 B2
(45) Date of Patent: Jun. 25, 2019

(54) HUMIC ACID-BASED SUPERCAPACITORS

(71) Applicant: Nanotek Instruments, Inc., Dayton, OH (US)

(72) Inventors: Song-Hai Chai, Centerville, OH (US); Aruna Zhamu, Springboro, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 0 days.

(21) Appl. No.: 15/211,209

(22) Filed: Jul. 15, 2016

(65) Prior Publication Data

US 2018/0019070 A1    Jan. 18, 2018

(51) Int. Cl.
| | |
|---|---|
| *H01G 11/42* | (2013.01) |
| *C01B 19/04* | (2006.01) |
| *C01G 39/06* | (2006.01) |
| *C01G 45/02* | (2006.01) |
| *C07G 1/00* | (2011.01) |

(Continued)

(52) U.S. Cl.
CPC ............. *H01G 11/42* (2013.01); *C01B 19/04* (2013.01); *C01B 32/19* (2017.08); *C01B 32/23* (2017.08); *C01G 39/06* (2013.01); *C01G 45/02* (2013.01); *C07G 1/00* (2013.01); *C08G 61/126* (2013.01); *C08H 6/00* (2013.01); *C11B 1/10* (2013.01); *H01G 11/24* (2013.01); *H01G 11/36* (2013.01); *H01G 11/46* (2013.01); *H01G 11/48* (2013.01); *H01G 11/52* (2013.01);

(Continued)

(58) Field of Classification Search
CPC ........ H01G 11/28; H01G 11/32; H01G 11/42; H01G 11/46; H01G 11/48; H01G 11/56; H01G 11/68
See application file for complete search history.

(56) References Cited

U.S. PATENT DOCUMENTS

| | | |
|---|---|---|
| 6,913,154 B2 | 7/2005 | Koslow |
| 7,071,258 B1 | 7/2006 | Jang |

(Continued)

FOREIGN PATENT DOCUMENTS

| | | |
|---|---|---|
| CN | 1230972 A | 10/1999 |
| CN | 103641117 A | 3/2014 |

(Continued)

OTHER PUBLICATIONS

Duraia et al., "Reduced humic acid nanosheets and its uses as nanofiller" J. Phys. Chem. Solids (2015) vol. 85, pp. 86-90.

(Continued)

*Primary Examiner* — Nguyen T Ha

(57) ABSTRACT

A supercapacitor electrode comprising a mixture of graphene sheets and humic acid, wherein humic acid occupies 0.1% to 99% by weight of the mixture and the graphene sheets are selected from a pristine graphene material having essentially zero % of non-carbon elements, or a non-pristine graphene material having 0.001% to 5% by weight of non-carbon elements wherein said non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof; and wherein said mixture has a specific surface area greater than 500 $m^2/g$.

19 Claims, 8 Drawing Sheets

(51) Int. Cl.

| | |
|---|---|
| *C08G 61/12* | (2006.01) |
| *C08H 7/00* | (2011.01) |
| *C11B 1/10* | (2006.01) |
| *H01G 11/24* | (2013.01) |
| *H01G 11/36* | (2013.01) |
| *H01G 11/46* | (2013.01) |
| *H01G 11/48* | (2013.01) |
| *H01G 11/52* | (2013.01) |
| *C01B 32/23* | (2017.01) |
| *C01B 32/19* | (2017.01) |

(52) U.S. Cl.
CPC .. *C01P 2004/03* (2013.01); *C08G 2261/3223* (2013.01); *C08G 2261/77* (2013.01)

(56) References Cited

U.S. PATENT DOCUMENTS

| | | | |
|---|---|---|---|
| 7,623,340 B1 | 11/2009 | Song | |
| 7,948,739 B2 | 5/2011 | Zhamu | |
| 9,053,870 B2 | 6/2015 | Yu et al. | |
| 2005/0271547 A1* | 12/2005 | Gerber | A61B 5/14532 422/82.05 |
| 2005/0271574 A1 | 12/2005 | Jang | |
| 2008/0048152 A1 | 2/2008 | Jang | |
| 2009/0061312 A1 | 3/2009 | Zhamu | |
| 2009/0095942 A1 | 4/2009 | Yamaguchi et al. | |
| 2010/0021819 A1 | 1/2010 | Zhamu | |
| 2010/0035093 A1* | 2/2010 | Ruoff | H01G 11/36 429/493 |
| 2011/0159372 A1* | 6/2011 | Zhamu | H01G 11/38 429/232 |
| 2011/0201739 A1 | 8/2011 | Beall | |
| 2011/0243830 A1 | 10/2011 | Ozaki et al. | |
| 2012/0021250 A1 | 1/2012 | Lee et al. | |
| 2013/0112925 A1 | 5/2013 | Beall | |
| 2013/0141774 A1 | 6/2013 | McCarthy | |
| 2013/0224603 A1* | 8/2013 | Chen | B82Y 30/00 429/322 |
| 2014/0030590 A1* | 1/2014 | Wang | H01B 1/04 429/211 |
| 2014/0030636 A1 | 1/2014 | Zhao et al. | |
| 2014/0335420 A1 | 11/2014 | Yamamoto et al. | |
| 2015/0044364 A1 | 2/2015 | Katayama et al. | |
| 2015/0086881 A1 | 3/2015 | Zhamu et al. | |
| 2015/0118554 A1* | 4/2015 | Wu | H01G 11/26 429/217 |
| 2016/0118668 A1* | 4/2016 | DuPasquier | H01M 4/387 252/503 |

FOREIGN PATENT DOCUMENTS

| | | |
|---|---|---|
| CN | 103752281 B | 4/2016 |
| CN | 104900876 B | 5/2017 |
| JP | 58117649 | 7/1983 |

OTHER PUBLICATIONS

PCT/US17/18708 International Search Report and Written Opinion dated Jun. 6, 2017, 12 pages.
English language translation CN103641117 from Google Patents https://www.google.com/patents/CN103641117A?cl=en, 5 pages.
English language translation CN103752281 from Patseer https://app.patseer.com/RecordDetails?paramString=pnkc%3DUS2015328621A1%26startindex%3D0%26listid%3DO%26ProjectID%3D0%26indexpath%3D1%, 8 pages.
English language translation CN1230972 from Google Patents https://www.google.com/patent/CN1230972A/en, 22 pages.
PCT/US17/036032 International Search Report and Written Opinion dated Aug. 25, 2017, 11 pages.
Porada et al., "Review on the science and technology of water desalination by capacitive deionizaton" Progress in Materials Science (2013) vol. 58, pp. 1388-1442.
Bor Z. Jang and A. Zhamu, "Processing of Nano Graphene Platelets (NGPs) and NGP Nanocomposites: A Review," J. Materials Sci. 43 (2008) 5092-5101.
Rice et al., "Statistical evaluation of the elemental composition of humic substances" Org. Geochem. (1991) vol. 17, No. 5, pp. 635-648.

* cited by examiner

_____ 2 μm

___3 μm

HUMIC ACID-BASED SUPERCAPACITORS

FIELD OF THE INVENTION

The present invention relates generally to the field of supercapacitors or ultracapacitors, and more particularly to the humic acid- and graphene/humic acid-based electrode and supercapacitors containing such an electrode.

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but supercapacitors (with their ability to release energy much more quickly than batteries) would kick in whenever the car needs to accelerate for merging, passing, emergency maneuvers, and hill climbing. The EC must also store sufficient energy to provide an acceptable driving range. To be cost-, volume-, and weight-effective compared to additional battery capacity they must combine adequate energy densities (volumetric and gravimetric) and power densities (volumetric and gravimetric) with long cycle life, and meet cost targets as well.

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC relative to conventional capacitors (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1 nm, thus forming an extremely small effective "plate separation." Such a supercapacitor is commonly referred to as an electric double layer capacitor (EDLC). The double layer capacitor is based on a high surface area electrode material, such as activated carbon, immersed in a liquid electrolyte. A polarized double layer is formed at electrode-electrolyte interfaces providing high capacitance. This implies that the specific capacitance of a supercapacitor is directly proportional to the specific surface area of the electrode material. This surface area must be accessible by electrolyte and the resulting interfacial zones must be sufficiently large to accommodate the so-called electric double-layer charges.

In some ECs, stored energy is further augmented by pseudo-capacitance effects, occurring again at the solid-electrolyte interface due to electrochemical phenomena such as the redox charge transfer. Such a supercapacitor is commonly referred to as a pseudo-capacitor or redox supercapacitor. A third type of supercapacitor is a lithium-ion capacitor that contains a pre-lithiated graphite anode, an EDLC cathode (e.g. typically based on activated carbon particles), and a lithium salt electrolyte. A fourth type of supercapacitor is a sodium-ion capacitor that contains a pre-sodiated hard carbon anode, an EDLC cathode (e.g. typically based on activated carbon particles), and a sodium salt electrolyte.

However, there are several serious technical issues associated with current state-of-the-art supercapacitors:

(1) Experience with supercapacitors based on activated carbon electrodes shows that the experimentally measured capacitance is always much lower than the geometrical capacitance calculated from the measured surface area and the width of the dipole layer. For very high surface area activated carbons, typically only about 20-40 percent of the "theoretical" capacitance was observed. This disappointing performance is due to the presence of micro-pores (<2 nm, mostly <1 nm) and ascribed to inaccessibility of some pores by the electrolyte, wetting deficiencies, and/or the inability of a double layer to form successfully in pores in which the oppositely charged surfaces are less than about 1-2 nm apart. In activated carbons, depending on the source of the carbon and the heat treatment temperature, a surprising amount of surfaces can be in the form of such micro-pores that are not accessible to liquid electrolyte.

(2) Despite the high gravimetric capacitances at the electrode level (based on active material weights alone) as frequently claimed in open literature and patent documents, these electrodes unfortunately fail to provide energy storage devices with high capacities at the supercapacitor cell or pack level (based on the total cell weight or pack weight). This is due to the notion that, in these reports, the actual mass loadings of the electrodes and the apparent densities for the active materials are too low. In most cases, the active material mass loadings of the electrodes (areal density) is significantly lower than 10 $mg/cm^2$ (areal density=the amount of active materials per electrode cross-sectional area along the electrode thickness direction) and the apparent volume density or tap density of the active material is typically less than 0.75 $g/cm^3$ (more typically less than 0.5 $g/cm^3$ and most typically less than 0.3 $g/cm^3$) even for relatively large particles of activated carbon.

The low mass loading is primarily due to the inability to obtain thicker graphene-based electrodes (thicker than 100 µm) using the conventional slurry coating procedure. This is not a trivial task as one might think, and in reality the electrode thickness is not a design parameter that can be arbitrarily and freely varied for the purpose of optimizing the cell performance. Contrarily, thicker electrodes tend to become extremely brittle or of poor structural integrity and would also require the use of large amounts of binder resin. These problems are particularly acute for graphene material-based electrodes. It has not been previously possible to produce graphene-based electrodes that are thicker than 100 µm and remain highly porous with pores remaining fully accessible to liquid electrolyte. The low areal densities and low volume densities (related to thin electrodes and poor packing density) result in relatively low volumetric capacitances and low volumetric energy density of the supercapacitor cells.

With the growing demand for more compact and portable energy storage systems, there is keen interest to increase the utilization of the volume of the energy storage devices. Novel electrode materials and designs that enable high volumetric capacitances and high mass loadings are essential to achieving improved cell volumetric capacitances and energy densities.

(3) During the past decade, much work has been conducted to develop electrode materials with increased volumetric capacitances utilizing porous carbon-based materials, such as graphene, carbon nanotube-based composites, porous graphite oxide, and porous meso carbon. Although these experimental supercapacitors featuring such electrode materials can be charged and discharged at high rates and also exhibit large volumetric electrode capacitances (50 to 150 F/cm$^3$ in most cases, based on the electrode volume), their typical active mass loading of <1 mg/cm$^2$, tap density of <0.2 g/cm$^3$, and electrode thicknesses of up to tens of micrometers (<<50 μm) are still significantly lower than those used in most commercially available electrochemical capacitors (i.e. 10 mg/cm$^2$, 100-200 μm), which results in energy storage devices with relatively low areal and volumetric capacitances and low volumetric energy densities.

(4) For graphene-based supercapacitors, there are additional problems that remain to be solved, explained below:

A single graphene sheet provides a specific external surface area of approximately 2,675 m$^2$/g (that is accessible by liquid electrolyte), as opposed to the exterior surface area of approximately 1,300 m$^2$/g provided by a corresponding single-wall CNT (interior surface not accessible by electrolyte). The instant applicants (A. Zhamu and B. Z. Jang) and their colleagues were the first to investigate graphene-based supercapacitors [Please see Refs. 1-5 below; the 1$^{st}$ patent application was submitted in 2006 and issued in 2009]. After 2008, researchers began to realize the significance of graphene materials for supercapacitor applications.

LIST OF REFERENCES

1. Lulu Song, A. Zhamu, Jiusheng Guo, and B. Z. Jang "Nano-scaled Graphene Plate Nanocomposites for Supercapacitor Electrodes" U.S. Pat. No. 7,623,340 (Nov. 24, 2009).
2. Aruna Zhamu and Bor Z. Jang, "Process for Producing Nano-scaled Graphene Platelet Nanocomposite Electrodes for Supercapacitors," U.S. patent application Ser. No. 11/906,786 (Oct. 4, 2007).
3. Aruna Zhamu and Bor Z. Jang, "Graphite-Carbon Composite Electrodes for Supercapacitors" U.S. patent application Ser. No. 11/895,657 (Aug. 27, 2007).
4. Aruna Zhamu and Bor Z. Jang, "Method of Producing Graphite-Carbon Composite Electrodes for Supercapacitors" U.S. patent application Ser. No. 11/895,588 (Aug. 27, 2007).
5. Aruna Zhamu and Bor Z. Jang, "Graphene Nanocomposites for Electrochemical cell Electrodes," U.S. patent application Ser. No. 12/220,651 (Jul. 28, 2008).

However, individual nano graphene sheets have a great tendency to re-stack themselves, effectively reducing the specific surface areas that are accessible by the electrolyte in a supercapacitor electrode. The significance of this graphene sheet overlap issue may be illustrated as follows: For a nano graphene platelet with dimensions of l (length)×w (width)×t (thickness) and density ρ, the estimated surface area per unit mass is $S/m = (2/\rho)(1/l + 1/w + 1/t)$. With $\rho \cong 2.2$ g/cm$^3$, l=100 nm, w=100 nm, and t=0.34 nm (single layer), we have an impressive S/m value of 2,675 m$^2$/g, which is much greater than that of most commercially available carbon black or activated carbon materials used in the state-of-the-art supercapacitor. If two single-layer graphene sheets stack to form a double-layer graphene, the specific surface area is reduced to 1,345 m$^2$/g. For a three-layer graphene, t=1 nm, we have S/m=906 m$^2$/g. If more layers are stacked together, the specific surface area would be further significantly reduced.

These calculations suggest that it is critically important to find a way to prevent individual graphene sheets from re-stacking and, even if they partially re-stack, the resulting multi-layer structure would still have inter-layer pores of adequate sizes. These pores must be sufficiently large to allow for accessibility by the electrolyte and to enable the formation of electric double-layer charges, which presumably require a pore size of at least 1-2 nm. However, these pores or inter-graphene spacings must also be sufficiently small to ensure a large tap density (hence, large capacitance per unit volume or large volumetric energy density). Unfortunately, the typical tap density of graphene-based electrode produced by the conventional process is less than 0.3 g/cm$^3$, and most typically <<0.2 g/cm$^3$. To a great extent, the requirement to have large pore sizes and high porosity level and the requirement to have a high tap density are considered mutually exclusive in the art of supercapacitors.

Another major technical barrier to using graphene sheets as a supercapacitor electrode active material is the challenge of forming a thick active material layer onto the surface of a solid current collector (e.g. Al foil) using the conventional graphene-solvent slurry coating process. In such an electrode, the graphene electrode typically requires a large amount of a binder resin (hence, significantly reduced active material proportion vs. non-active or overhead materials/components). In addition, any graphene electrode prepared in this manner that is thicker than 50 μm is brittle and weak. There has been no effective solution to these problems.

Therefore, there is clear and urgent need for supercapacitors that have high active material mass loading (high areal density), active materials with a high apparent density (high tap density), high electrode thickness, high volumetric capacitance, and high volumetric energy density. For graphene-based electrodes, one must also overcome problems such as re-stacking of graphene sheets, the demand for large proportion of a binder resin, and difficulty in producing thick graphene electrode layers.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene 5% by weight of oxygen), graphene oxide (≥5% by weight of oxygen), slightly fluorinated graphene 5% by weight of fluorine), graphene fluoride ((≥5% by weight of fluorine), other halogenated graphene, and chemically functionalized graphene.

Our research group was the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were reviewed by us [Bor Z. Jang and A. Zhamu, "Processing of Nano Graphene Platelets (NGPs) and NGP Nanocomposites: A Review," J. Materials Sci. 43 (2008) 5092-5101].

Most of the prior art processes for graphene production begin with the use of highly purified natural graphite as the starting material. The purification of graphite ore involves the use of large amounts of undesirable chemicals. Clearly, a need exists to have a more cost-effective process that produces graphene sheets or graphene-like 2D materials (particularly single-layer graphene and few-layer graphene-like sheets) directly from coal or coal derivatives and readily converts the graphene-like sheets into a porous supercapacitor electrode. Such a process not only avoids the environment-polluting graphite ore purification procedures but also makes it possible to have low-cost graphene or graphene-like 2D materials available. As of today, the graphene, as an industry, has yet to emerge mainly due to the extremely high graphene costs that have thus far prohibited graphene-based products from being widely accepted in the market place.

Humic acid (HA) is an organic matter commonly found in soil and can be extracted from the soil using a base (e.g. KOH). HA can also be extracted, with a high yield, from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is similar to graphene oxide (GO) produced by strong acid oxidation of natural graphite. HA has a typical oxygen content of 5% to 42% by weight (other major elements being carbon and hydrogen). HA, after chemical or thermal reduction, has an oxygen content of 0.01% to 5% by weight. For claim definition purposes in the instant application, humic acid (HA) refers to the entire oxygen content range, from 0.01% to 42% by weight. The reduced humic acid (RHA) is a special type of HA that has an oxygen content of 0.01% to 5% by weight.

The present invention is directed at a new class of graphene-like 2D materials (i.e. humic acid) that surprisingly can be used, alone or in a combination with graphene, to form a supercapacitor electrode that delivers both high energy density and high power density per unit cell weight and per unit cell volume.

Another object of the present invention is a process for producing humic acid-based supercapacitor electrode that has an exceptionally high active material mass loading, typically higher than 10 mg/cm$^2$, preferably and more typically higher than 20 mg/cm$^2$, and more preferably and even more typically higher than 30 mg/cm$^2$, which thus far has not been possible with graphene-based electrodes.

SUMMARY OF THE INVENTION

One preferred embodiment of the present invention is a supercapacitor electrode comprising a mixture of graphene sheets and humic acid, wherein humic acid occupies 0.1% to 99% by weight of the mixture and the graphene sheets are selected from a pristine graphene material having essentially zero % of non-carbon elements, or a non-pristine graphene material having 0.001% to 5% by weight of non-carbon elements wherein the non-pristine graphene is selected from graphene oxide, reduced graphene oxide, graphene fluoride, graphene chloride, graphene bromide, graphene iodide, hydrogenated graphene, nitrogenated graphene, chemically functionalized graphene, or a combination thereof; and wherein the mixture has a specific surface area greater than 500 m$^2$/g (preferably >1,000 m$^2$/g, more preferably >1,500 m$^2$/g, and most preferably >2,000 m$^2$/g).

Another preferred embodiment is a supercapacitor electrode comprising humic acid molecules or sheets having an oxygen content of 0.01% to 42% by weight. The electrode has a specific surface area greater than 500 m$^2$/g (preferably >1,000 m$^2$/g, more preferably >1,500 m$^2$/g, and most preferably >2,000 m$^2$/g). This electrode does not contain any graphene sheet (not a graphene-humic acid mixture). Preferably, the oxygen content is from 0.01% to 5% by weight.

In some preferred embodiments, the electrode comprises multiple particulates (secondary particles) that are porous and each particulate is composed of multiple humic acid molecules or sheets (no graphene sheets) packed into a spherical or ellipsoidal shape.

In other preferred embodiments, the supercapacitor electrode comprises multiple particulates that are porous and each particulate is composed of multiple humic acid molecules and graphene sheets that are packed into a spherical or ellipsoidal shape.

In the supercapacitor electrode, preferably the graphene sheets comprise single-layer graphene and/or few-layer graphene having an average thickness no greater than 2 nm or no more than 5 graphene planes per sheet.

In the supercapacitor electrode, the humic acid preferably contains isolated single molecules. In some embodiments, a number of humic acid molecules (planar shape or in a nano sheet form) are stacked together to form a domain or ordered structure.

In some embodiments, the graphene sheets or humic acid molecules are functionalized with one or more of conducting polymers, transition metal oxides, or transition metal sulfides. In certain embodiments, the graphene sheets are chemically or physically activated.

The present invention also provides a supercapacitor comprising an anode, a cathode, a porous separator disposed between the anode and the cathode, a liquid electrolyte in ionic contact with the anode and the cathode, wherein at least one of the anode and the cathode contains the humid acid-based or humic acid/graphene mixture-based supercapacitor electrode as described above.

In certain embodiments, the graphene sheets and/or said humid acid molecules in the supercapacitor electrode are bonded by or bonded to a conductive binder material selected from the group consisting of a conducting polymer, a polymeric carbon, an amorphous carbon, a petroleum pitch, a coal tar pitch, a meso-phase pitch, and combinations thereof. In some preferred embodiments, the graphene sheets are activated, surface-functionalized, or surface-coated with functional materials or chemical groups for enhanced capacitance. Preferably, the graphene sheets are functionalized with one or more of conducting polymers, transition metal oxides, or transition metal sulfides.

In a humic acid- or humic acid/graphene-based supercapacitor, preferably, the anode or the cathode (or both) further contains a redox pair partner material selected from a metal oxide, a conducting polymer, an organic material, a non-graphene carbon material, an inorganic material, or a combination thereof, wherein the partner material, in combination with graphene sheets or humic acid, forms a redox pair for providing pseudo-capacitance.

The metal oxide may be selected from $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof. The inorganic material may be selected from a metal carbide, metal nitride, metal boride, metal dichalcogenide, or a combination thereof. Preferably, the metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. In some embodiments, the inorganic material is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

The presently invented supercapacitor may be selected from a symmetric supercapacitor, an asymmetric supercapacitor, a redox supercapacitor, a lithium-ion capacitor, or a sodium-ion capacitor.

DESCRIPTION OF THE PREFERRED EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Figure 1:
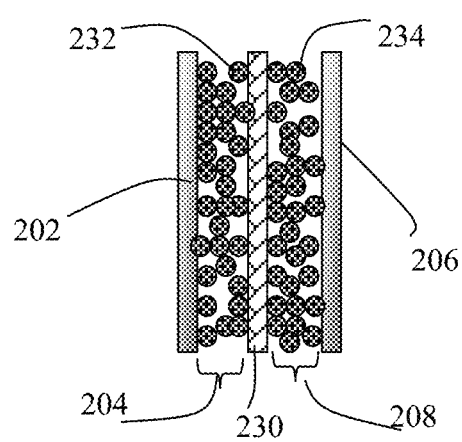
FIG. 1 Schematic of a supercapacitor cell.

As schematically illustrated in FIG. 1, a prior art supercapacitor cell is typically composed of an anode current collector 202 (e.g. Al foil 12-15 μm thick), an anode active material layer 204 (containing an anode active material, such as activated carbon particles 232 and conductive additives that are bonded by a resin binder, such as PVDF), a porous separator 230, a cathode active material layer 208 (containing a cathode active material, such as activated carbon particles 234, and conductive additives that are all bonded by a resin binder, not shown), a cathode current collector 206 (e.g. Al foil), and a liquid electrolyte disposed in both the anode active material layer 204 (also simply referred to as the "anode layer") and the cathode active material layer 208 (or simply "cathode layer"). The entire cell is encased in a protective housing, such as a thin plastic-aluminum foil laminate-based envelop.

The prior art supercapacitor cell is typically made by a process that includes the following steps:

a) The first step is mixing particles of the anode active material (e.g. activated carbon), a conductive filler (e.g. graphite flakes), a resin binder (e.g. PVDF) in a solvent (e.g. NMP) to form an anode slurry. On a separate basis, particles of the cathode active material (e.g. activated carbon), a conductive filler (e.g. acetylene black), a resin binder (e.g. PVDF) are mixed and dispersed in a solvent (e.g. NMP) to form a cathode slurry.

b) The second step includes coating the anode slurry onto one or both primary surfaces of an anode current collector (e.g. Cu or Al foil), drying the coated layer by vaporizing the solvent (e.g. NMP) to form a dried anode electrode coated on Cu or Al foil. Similarly, the cathode slurry is coated and dried to form a dried cathode electrode coated on Al foil.

c) The third step includes laminating an anode/Al foil sheet, a porous separator layer, and a cathode/Al foil sheet together to form a 3-layer or 5-layer assembly, which is cut and slit into desired sizes and stacked to form a rectangular structure (as an example of shape) or rolled into a cylindrical cell structure.

d) The rectangular or cylindrical laminated structure is then encased in an aluminum-plastic laminated envelope or steel casing.

e) A liquid electrolyte is then injected into the laminated structure to make a supercapacitor cell.

There are several serious problems associated with the process and the resulting supercapacitor cell:

1) It is very difficult to produce an electrode layer (anode layer or cathode layer) that is thicker than 100 μm and practically impossible or impractical to produce an electrode layer thicker than 200 μm. There are several reasons why this is the case. An electrode of 100 μm thickness typically requires a heating zone of 30-50 meters long in a slurry coating facility, which is too time consuming, too energy intensive, and not cost-effective. For some electrode active materials, such as graphene sheets, it has not been possible to produce an electrode thicker than 50 μm in a real manufacturing environment on a continuous basis. This is despite the notion that some thicker electrodes have been claimed in open or patent literature, but these electrodes were prepared in a laboratory on a small scale. In a laboratory setting, presumably one could repeatedly add new materials to a layer and manually consolidate the layer to increase the thickness of an electrode. However, even with such a procedure, the resulting electrode becomes very fragile and brittle. This is even worse for graphene-based electrodes, since repeated compressions lead to re-stacking of graphene sheets and, hence, significantly reduced specific surface area and reduced specific capacitance.

2) With a conventional supercapacitor, as depicted in FIG. 1, the actual mass loadings of the electrodes and the apparent densities for the active materials are too low. In most cases, the active material mass loadings of the electrodes (areal density) is significantly lower than 10 mg/cm$^2$ and the apparent volume density or tap density of the active material is typically less than 0.75 g/cm$^3$ (more typically less than 0.5 g/cm$^3$ and most typically less than 0.3 g/cm$^3$) even for relatively large particles of activated carbon. In addition, there are so many other non-active materials (e.g. conductive additive and resin binder) that add additional weights and volumes to the electrode without contributing to the cell capacity. These low areal densities and low volume densities result in relatively low volumetric capacitances and low volumetric energy density.

3) Current supercapacitors (e.g. symmetric supercapacitors or electric double layer capacitors, EDLC) still suffer from a relatively low gravimetric energy density and low volumetric energy density. Commercially available EDLCs exhibit a gravimetric energy density of approximately 6 Wh/kg and no experimental EDLC cells have been reported to exhibit an energy density higher than 10 Wh/kg (based on the total cell weight) at room temperature. Although experimental supercapacitors exhibit large volumetric electrode capacitances (100 to 200 F/cm$^3$ in most cases) at the electrode level (not the cell level), their typical active mass loading of <1 mg/cm$^2$, tap density of <0.1 g/cm$^{-3}$, and electrode thicknesses of up to tens of micrometers remain significantly lower than those used in most commercially available electrochemical capacitors, resulting in energy storage devices with relatively low areal and volumetric capacities and low volumetric energy densities based on the cell (device) weight.

In literature, the energy density data reported based on either the active material weight alone or electrode weight cannot directly translate into the energy densities of a practical supercapacitor cell or device. The "overhead weight" or weights of other device components (binder, conductive additive, current collectors, separator, electrolyte, and packaging) must also be taken into account. The convention production process results in an active material proportion being less than 30% by weight of the total cell weight (<15% in some cases; e.g. for graphene-based active material).

The present invention provides a new active material that enables several cost-effective processes to become suitable for producing a supercapacitor cell having a high electrode thickness, high active material mass loading, low overhead weight and volume, high volumetric capacitance, and high volumetric energy density.

In a preferred embodiment, the graphene material (to be combined with humic acid as an electrode active material) may be selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, meso-phase carbon, meso-phase pitch, meso-carbon micro-bead, soft carbon, hard carbon, coke, carbon fiber, carbon nano-fiber, carbon nano-tube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets (collectively, NGPs) are a new class of carbon nano material (a 2-D nano carbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nano-fiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004); and (3) B. Z. Jang, A. Zhamu, and J. Guo, "Process for Producing Nano-scaled Platelets and Nanocomposites," U.S. patent application Ser. No. 11/509,424 (Aug. 25, 2006).

In one process, graphene materials are obtained by intercalating natural graphite particles with a strong acid and/or an oxidizing agent to obtain a graphite intercalation compound (GIC) or graphite oxide (GO). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder in a mixture of sulfuric acid, nitric acid (an oxidizing agent), and another oxidizing agent (e.g. potassium permanganate or sodium perchlorate). The resulting GIC is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range of typically 800-1,050° C. for approximately 30 seconds to 2 minutes, the GIC undergoes a rapid volume expansion by a factor of 30-300 to form "graphite worms", which are each a collection of exfoliated, but largely un-separated graphite flakes that remain interconnected.

The exfoliated graphite may be subjected to high-intensity mechanical shearing (e.g. using an ultrasonicator, high-shear mixer, high-intensity air jet mill, or high-energy ball mill) to form separated single-layer and multi-layer graphene sheets (collectively called graphene sheets or NGPs). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphene structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

Despite the fact that individual graphene sheets have an exceptionally high specific surface area, graphene sheets have a great tendency to re-stack together or to overlap with one another, thereby dramatically reducing the specific capacitance due to the significantly reduced specific surface area that is accessible by the electrolyte. This tendency to re-stack is particularly acute during the supercapacitor cell electrode production process. In this process, graphene sheets, along with other conductive additive and resin binder (e.g. PVDF), are dispersed in a solvent (typically NMP) to form a slurry, which is then coated on a surface of a solid current collector (e.g. Al foil). The solvent is then removed (vaporized) to form a dried layer of active material electrode, which is then fed through a pair of rollers in a compression machine to consolidate the electrode layer. These drying and compressing procedures induce severe graphene re-stacking. In many of the scientific reports, even though the graphene sheets in an original powder form were found to exhibit an exceptionally high specific surface area, the resulting electrode only shows an unexpectedly lower specific capacitance. Theoretically, the maximum specific capacitance of a single-layer graphene-based supercapacitor is as high as 550 F/g (based on an EDLC structure, no redox pair or pseudo-capacitance), but experimentally achieved values have been in the range of mere 90-170 F/g. This has been a long-standing problem in the art of supercapacitors.

The present invention provides a new class of supercapacitor electrode active material that can be used alone or in combination with graphene. Humic acid (HA) is an organic matter commonly found in soil and can be extracted from the soil using a base (e.g. KOH). HA can also be extracted, with a high yield, from a type of coal called leonardite, which is a highly oxidized version of lignite coal. HA is a planar or sheet-like molecule having a graphene-like hexagonal carbon structure. HA extracted from leonardite contains a number of oxygenated groups (e.g. carboxyl groups) located around the edges of the graphene-like molecular center ($SP^2$ core). This material is similar to graphene oxide (GO) produced by strong acid oxidation of natural graphite. HA has a typical oxygen content of 5% to 42% by weight (other major elements being carbon and hydrogen). HA, after chemical or thermal reduction, has an oxygen content of 0.01% to 5% by weight. For claim definition purposes in the instant application, humic acid (HA) refers to the entire oxygen content range, from 0.01% to 42% by weight. The reduced humic acid (RHA) is a special type of HA that has an oxygen content of 0.01% to 5% by weight.

After extensive experimental work we have come to realize that it is also difficult to form humic acid-based electrode layers that are thicker than 100 μm if one follows the traditional slurry coating process. A huge amount of binder resin (e.g. PVDF) is required to make an electrode of adequate structural integrity. Unfortunately, the binder resin is non-active, incapable of forming electric double layers of charges (i.e. cannot store charges). A larger proportion of non-active materials would mean a smaller proportion of electro-active materials capable of storing charges, leading to lower specific capacitance (capacitance per unit cell weight or volume).

However, quite unexpectedly, we have found that this problem can be overcome if one can pack primary particles (humic acid sheets, alone or in combination with graphene sheets) together to form secondary particles (particulates) that are porous. This can be accomplished by using ball milling, spray-drying, or other means of making secondary particles from primary particles. These particulates can then be packed together to form thick electrodes that require a relatively low proportion of non-active binder resin. Thus, preferably, the electrode comprises multiple particulates (secondary particles) that are porous and each particulate is composed of multiple humic acid molecules or sheets (with or without graphene sheets) packed into a spherical or ellipsoidal shape.

The planar or sheet-like humic acid molecules and graphene sheets used in the aforementioned supercapacitor electrodes may be subjected to the following treatments, separately or in combination:
 (a) These sheets or sheet-like molecules may be chemically functionalized or doped with atomic, ionic, or molecular species. Useful surface functional groups may include quinone, hydroquinone, quaternized aromatic amines, mercaptans, or disulfides. This class of functional groups can impart redox-based pseudo-capacitance to humic acid and/or graphene-based supercapacitors.
 (b) May be coated or grafted with an intrinsically conductive polymer (conjugate polymers, such as polyacetylene, polypyrrole, polyaniline, polythiophene, and their derivatives), are good choices for use in the present invention); These treatments are intended for further increasing the capacitance value through pseudo-capacitance effects such as redox reactions.
 (c) May be deposited with transition metal oxides or sulfides, such as $RuO_2$, $TiO_2$, $MnO_2$, $Cr_2O_3$, and $Co_2O_3$, for the purpose of forming redox pairs with humic acid or graphene sheets, thereby imparting pseudo-capacitance to the electrode; and
 (d) May be subjected to an activation treatment (analogous to activation of carbon particles) to create additional surfaces and possibly imparting functional chemical groups to these surfaces. The activation treatment can be accomplished through $CO_2$ physical activation, KOH chemical activation, or exposure to nitric acid, fluorine, or ammonia plasma.

We have discovered that a wide variety of two-dimensional (2D) inorganic materials can be used in the presented invented humic acid-containing supercapacitors. Layered materials represent a diverse source of 2D systems that exhibit unexpected electronic properties and high specific surface areas that are important for supercapacitor applications. Although graphite is the best known layered material, transition metal dichalcogenides (TMDs), transition metal oxides (TMOs), and a broad array of other compounds, such as BN, $Bi_2Te_3$, and $Bi_2Se_3$, are also potential sources of 2D materials.

Non-graphene 2D nano materials, single-layer or few-layer (up to 10 layers), can be produced by several methods: mechanical cleavage, laser ablation (e.g. using laser pulses to ablate TMDs down to a single layer), liquid phase exfoliation, and synthesis by thin film techniques, such as PVD (e.g. sputtering), evaporation, vapor phase epitaxy, liquid phase epitaxy, chemical vapor epitaxy, molecular beam epitaxy (MBE), atomic layer epitaxy (ALE), and their plasma-assisted versions.

We have surprisingly discovered that most of these inorganic materials, when in a 2D nano-disc, nano-platelet, nano-belt, or nano-ribbon form, exhibit remarkable EDLC values, even though these inorganic materials are normally considered as electrically non-conducting and, hence, not a candidate supercapacitor electrode material. The supercapacitance values are exceptionally high when these 2D nano materials are used in combination with a small amount of humic acid and/or graphene sheets (particularly single-layer graphene). The required single-layer graphene or humic acid can be from 0.1% to 50% by weight, more preferably from 0.5% to 25%, and most preferably from 1% to 15% by weight.

In the instant invention, there is no limitation on the type of liquid electrolytes that can be used in the supercapacitor: aqueous, organic, gel, and ionic liquid. Typically, electrolytes for supercapacitors consist of solvent and dissolved chemicals (e.g. salts) that dissociate into positive ions (cations) and negative ions (anions), making the electrolyte electrically conductive. The more ions the electrolyte contains, the better its conductivity, which also influences the capacitance. In supercapacitors, the electrolyte provides the molecules for the separating monolayer in the Helmholtz double-layer (electric double layer) and delivers the ions for pseudocapacitance.

Water is a relatively good solvent for dissolving inorganic chemicals. When added together with acids such as sulfuric acid ($H_2SO_4$), alkalis such as potassium hydroxide (KOH), or salts such as quaternary phosphonium salts, sodium perchlorate ($NaClO_4$), lithium perchlorate ($LiClO_4$) or lithium hexafluoride arsenate ($LiAsF_6$), water offers relatively high conductivity values. Aqueous electrolytes have a dissociation voltage of 1.15 V per electrode and a relatively low operating temperature range. Water electrolyte-based supercapacitors exhibit low energy density.

Alternatively, electrolytes may contain organic solvents, such as acetonitrile, propylene carbonate, tetrahydrofuran, diethyl carbonate, γ-butyrolactone, and solutes with quaternary ammonium salts or alkyl ammonium salts such as tetraethylammonium tetrafluoroborate ($N(Et)_4BF_4$) or tri-ethyl (metyl) tetrafluoroborate ($NMe(Et)_3BF_4$). Organic electrolytes are more expensive than aqueous electrolytes, but they have a higher dissociation voltage of typically 1.35 V per electrode (2.7 V capacitor voltage), and a higher temperature range. The lower electrical conductivity of organic solvents (10 to 60 mS/cm) leads to a lower power density, but a higher energy density since the energy density is proportional to the square of the voltage.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to 300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a supercapacitor.

In order to make a pseudo-capacitor (a supercapacitor that works on the development of pseudo-capacitance through redox pair formation), the anode active material or cathode active material may be designed to contain humic acid or graphene sheets and a redox pair partner material selected from a metal oxide, a conducting polymer, an organic material, a non-graphene carbon material, an inorganic material, or a combination thereof. Many of the materials that can pair up with reduced graphene oxide sheets are well-known in the art. In this study, we have come to realize that graphene halogenide (e.g. graphene fluoride), graphene hydrogenide, and nitrogenated graphene can work with a wide variety of partner materials to form a redox pair for developing pseudo-capacitance.

For instance, the metal oxide or inorganic materials that serve in such a role include $RuO_2$, $IrO_2$, $NiO$, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, $MoC_x$, $Mo_2N$, or a combination thereof. In general, the inorganic material may be selected from a metal carbide, metal nitride, metal boride, metal dichalcogenide, or a combination thereof. Preferably, the desired metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form. These materials can be in the form of a simple mixture with sheets of a graphene material or humic acid, but preferably in a nano particle or nano coating form that that is physically or chemically bonded to a surface of the humic acid or graphene sheets prior to being formed into a slurry and injected into the pores of the porous current collectors.

In what follows, we provide some examples of several different types of humic acid/graphene materials and redox pair partner materials to illustrate the best mode of practicing the instant invention. Theses illustrative examples and other portions of instant specification and drawings, separately or in combinations, are more than adequate to enable a person of ordinary skill in the art to practice the instant invention. However, these examples should not be construed as limiting the scope of instant invention.

Example 1: Humic Acid and Reduced Humic Acid from Leonardite

Humic acid can be extracted by dispersing leonardite in a basic aqueous solution (pH of 10) with a very high yield (in the range of 75%). Subsequent acidification of the solution leads to precipitation of humic acid powder. In an experiment, 3 g of leonardite was dissolved by 300 ml of double deionized water containing 1 M KOH (or $NH_4OH$) solution under magnetic stirring. The pH value was adjusted to 10. The solution was then filtered to remove any big particles or any residual impurities. The resulting humic acid dispersion was subjected to solvo-hydrothermal reduction alone or with the presence of graphene oxide sheets (GO prepared in Example 3 described below) in a pressure reactor (heated autoclave).

In the present study, electrode active materials were also chosen based on humic acid sheets in combination with an inorganic material, which includes nano discs, nano platelets, or nano sheets of an inorganic material selected from: (a) bismuth selenide, (b) transition metal dichalcogenide, (c) sulfide or selenide of zirconium, molybdenum, titanium, cobalt, manganese, iron, and nickel; and (d) boron nitride.

Example 2: Preparation of Humic Acid from Coal

In a typical procedure, 300 mg of coal was suspended in concentrated sulfuric acid (60 ml) and nitric acid (20 ml), and followed by cup sonication for 2 h. The reaction was then stirred and heated in an oil bath at 100 or 120° C. for 24 h. The solution was cooled to room temperature and poured into a beaker containing 100 ml ice, followed by a step of adding NaOH (3M) until the pH value reached 7. The neutral mixture was then filtered through a 0.45-mm polytetrafluoroethylene membrane and the filtrate was dialyzed in 1,000 Da dialysis bag for 5 days. For the larger humic acid sheets, the time can be shortened to 1 to 2 h using cross-flow ultrafiltration. After purification, the solution was concentrated using rotary evaporation to obtain solid humic acid sheets. These humic sheets alone and their mixtures with graphene sheets were subjected to low-intensity ball-milling for 2 hours to obtain secondary particles that are porous and spherical or ellipsoidal in shape.

Example 3: Preparation of Graphene Oxide (GO) and Reduced Graphene Oxide (RGO) Nano Sheets From Natural Graphite Powder Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until a pH value >4.0 was reached. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO was obtained by diluting the wet-cake in an aqueous solution of surfactants instead of pure water. A mixture of cholate sodium (50 wt. %) and deoxycholate sodium (50 wt. %) salts provided by Sigma Aldrich was used. The surfactant weight fraction was 0.5 wt. %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt. % of GO was sonicated for 10 min and subsequently centrifuged at 2700 g for 30 min to remove any non-dissolved large particles, aggregates, and impurities.

Chemical reduction of as-obtained GO to yield RGO was conducted by following the method, which involved placing 10 mL of a 0.1 wt. % GO aqueous solution in a boiling flask of 50 mL. Then, 10 μL of a 35 wt. % aqueous solution of $N_2H_4$ (hydrazine) and 70 mL of a 28 wt. % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction.

Figure 2:
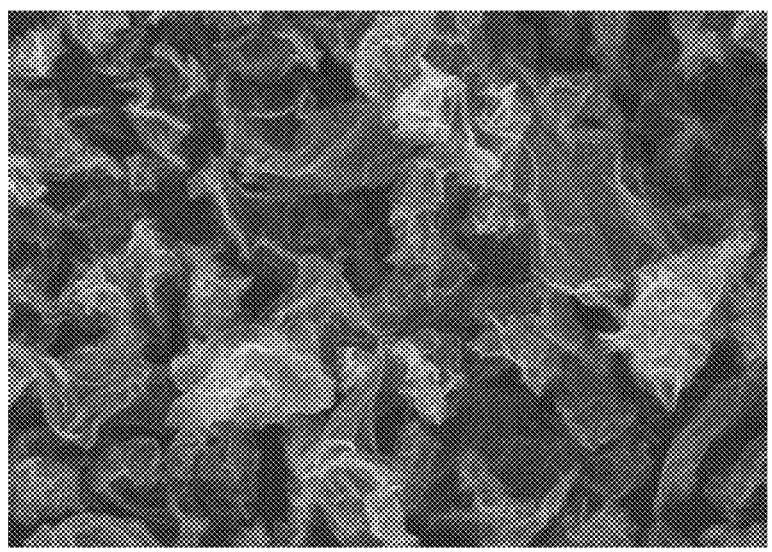
FIG. 2 SEM image of a humic acid/graphene mixture prepared by oven drying of suspension.
Figure 3:
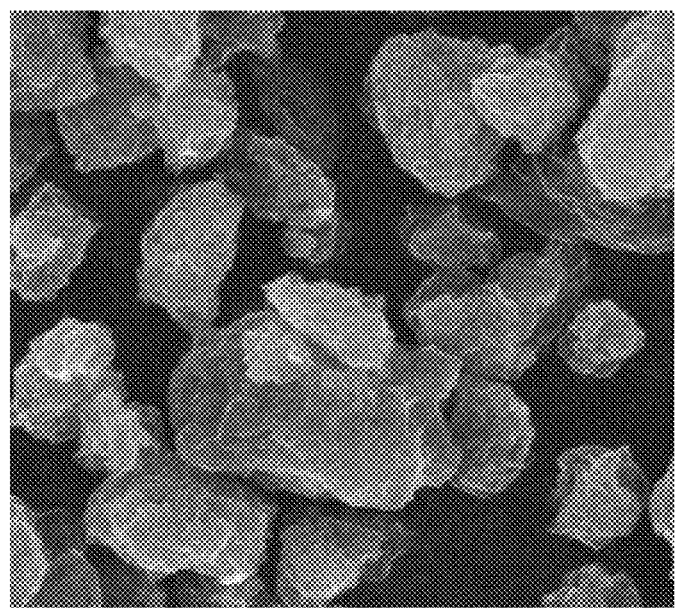
FIG. 3 SEM image of a humic acid/graphene mixture (secondary particles or particulates) prepared by ball milling of solid powder.

On a separate basis, water suspensions containing mixtures of GO and humic acid at various GO proportions (1%, 10%, 20%, 30%, 40%, 50%, 60%, 70%, 80%, 90%, and 99%) were both oven-dried and spray-dried to produce solid mixtures. The oven-dried powders are simple mixtures of graphene sheets and humic acid sheets (e.g. as in FIG. 2). The powders prepared by spray-drying and low-intensity ball-milling are in the form of secondary particles (herein referred to as particulates) that are more or less spherical or ellipsoidal in shape (e.g. as in FIG. 3) and are porous having mostly meso-scaled pores. Each particulate is composed of multiple graphene sheets and humic acid sheets mutually embraced and stacked together. These powders were then thermally reduced in a mixture of $H_2$ and $N_2$ gas at 350° C. for 24 hours. Upon completion of this thermal reduction treatment, the color of the samples turned dark black.

For comparison purposes, slurry coating and drying procedures were conducted to produce electrodes. Electrodes and a separator disposed between two electrodes (the anode and cathode) were then assembled and encased in an Al-plastic laminated packaging envelop, followed by liquid electrolyte injection to form a supercapacitor cell. Both organic electrolyte (acetonitrile+$N(Et)_4BF_4$) and ionic liquid electrolyte were used in the supercapacitor cells.

Example 4: Preparation of Pristine Graphene Sheets (0% Oxygen) as a Supercapacitor Electrode Active Material (in Combination with Humic Acid)

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. Pristine graphene is essentially free from any non-carbon elements.

The suspension after ultrasonication contains pristine graphene sheets dispersed in water and s surfactant dissolved therein. Humic acid was then added into the suspension and the resulting mixture suspension was further ultrasonicated for 10 minutes to facilitate uniform dispersion and mixing. The subsequently dried mixture powders were then incorporated in a supercapacitor. Several types of capacitors were investigated: (a) a symmetric EDLC supercapacitor wherein both the anode and the cathode contains the same graphene/humic acid mixture as the electrode active material, (b) a lithium-ion capacitor (LIC) featuring a pre-lithiated graphite particles as the anode active material and graphene/humic acid as the cathode active material, and (c) an asymmetric supercapacitor wherein the anode and the cathode has distinct compositions (e.g. the anode is an EDLC electrode and the cathode a pseudo-capacitance type electrode).

Example 5: Preparation of Graphene Fluoride Sheets as a Supercapacitor Active Material (in Combination with Humic Acid)

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7 days a gray-beige product with approximate formula $C_2F$ was formed.

Subsequently, a small amount of FHEG (approximately 0.5 mg) was mixed with 20-30 mL of an organic solvent (methanol and ethanol, separately) and subjected to an ultrasound treatment (280 W) for 30 min, leading to the formation of homogeneous yellowish dispersions. Upon removal of solvent, the dispersion became a brownish powder. This powder was then mixed with humic acid and the resulting blend was ball-milled to produce secondary particles.

Example 6: Preparation of Nitrogenataed Graphene Sheets as a Supercapacitor Electrode Active Material (in Combination with Humic Acid)

Graphene oxide (GO), synthesized in Example 3, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene: urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenataed graphene sheets remain dispersible in water. The resulting suspensions were then dried to obtain nitrogenated graphene powder. The powder was mixed with humic acid and the mixture was made into supercapacitor electrodes.

Example 7: Preparation of the $MoS_2$/RHC (Reduced Humic Acid) Hybrid Material as a Supercapacitor Active Material A wide variety of inorganic materials were investigated in this example. For instance, an ultra-thin $MoS_2$/RGO-RHC hybrid was synthesized by a one-step solvothermal reaction of $(NH_4)_2MoS_4$ and hydrazine in an N, N-dimethylformamide (DMF) solution of oxidized graphene oxide (GO) and/or HC at 200° C. In a typical procedure, 22 mg of $(NH_4)_2MoS_4$ was added to 10 mg of GO/HC dispersed in 10 ml of DMF. The mixture was sonicated at room temperature for approximately 10 min until a clear and homogeneous solution was obtained. After that, 0.1 ml of $N_2H_4 \cdot H_2O$ was added. The reaction solution was further sonicated for 30 min before being transferred to a 40 mL Teflon-lined autoclave. The system was heated in an oven at 200° C. for 10 h. Product was collected by centrifugation at 8000 rpm for 5 min, washed with DI water and recollected by centrifugation. The washing step was repeated for 3 times to ensure that most DMF was removed. Finally, product was dried and made into an electrode.

Example 8: Preparation of Two-Dimensional (2D) Layered $Bi_2Se_3$ Chalcogenide Nanoribbons The preparation of (2D) layered $Bi_2Se_3$ chalcogenide nanoribbons is well-known in the art. For instance, $Bi_2Se_3$ nanoribbons were grown using the vapor-liquid-solid (VLS) method. Nanoribbons herein produced are, on average, 30-55 nm thick with widths and lengths ranging from hundreds of nanometers to several micrometers. Larger nanoribbons were subjected to ball-milling for reducing the lateral dimensions (length and width) to below 200 nm. Nanoribbons prepared by these procedures were mixed with graphene sheets and/or HC molecules and used as a supercapacitor electrode active material.

Example 9: Preparation of $MnO_2$—Humic Acid Redox Pairs

The $MnO_2$ powder was synthesized by two methods (each with or without the presence of graphene sheets). In one method, a 0.1 mol/L $KMnO_4$ aqueous solution was prepared by dissolving potassium permanganate in deionized water. Meanwhile 13.32 g surfactant of high purity sodium bis(2-ethylhexyl) sulfosuccinate was added in 300 mL iso-octane (oil) and stirred well to get an optically transparent solution. Then, 32.4 mL of 0.1 mol/L $KMnO_4$ solution and selected amounts of GO or HC solution were added in the solution, which was ultrasonicated for 30 min to prepare a dark brown precipitate. The product was separated, washed several times with distilled water and ethanol, and dried at 80° C. for 12 h. The sample is graphene- or HC-supported $MnO_2$ in a powder form, which was ball-milled to form porous particulates. These particulates were then made into electrodes on the surfaces of an Al foil current collector.

Example 10: Humic Acid-Graphene Further Treated with Poly(3-Methyl-Thiophene)

Electronically conductive polymers by themselves are promising supercapacitor electrode materials because the charge process involves the entire polymer mass and they provide low equivalent series resistance for the electrode. When combined with a graphene- or humic acid-type substrate material, the conducting polymer can impart pseudo-capacitance to the electrode via the redox mechanism. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere. However, we chose to prepare PMeT doped with different anions electrochemically in the presence of tetra-alkyl-ammonium salts using a graphene/HC as an electrode. The specific capacitance of a layer of graphene paper, a layer of graphene/HC paper, and a layer of graphene/HC-pMeT paper were found to be 76 F/g, 192 F/g, and 365 F/g, respectively. These data have clearly demonstrated that the presently invented graphene-HC mixture is surprisingly effective in helping graphene-based electrodes to achieve a much higher capacitance as compared with graphene without humic acid.

Example 11: Transition Metal Halide as a Redox Pair Partner Material (in Combination with Humic Acid)

A number of transition metal halides bearing a 2,6-bis (imino)piridyl ligand, $LMCl_2$, where L=2,6-$(ArNCCH_3)_2$ $C_5H_3N$ and M=transition metal atom), have been synthesized (prior art). The manganese halide complex (M=Mn) was electrochemically deposited onto the surface of an graphene-HC mat electrode in a water-containing acetonitrile electrolyte (containing 0.1 M of tetra-butyl-ammonium perchlorate). By adjusting the imposing current density and reaction time one could readily form discrete particles bonded onto graphene/HC surfaces. With less than 10% by weight of manganese halide particles, the specific capacitance of the graphene-HC paper was increased from 102 F/g to 262 F/g. Other transition metal oxides or sulfides can also be used as a source of pseudocapacitance.

Example 12: Evaluation of Various Supercapacitor Cells

In a conventional cell, an electrode (cathode or anode), is typically composed of 85% an electrode active material (e.g. graphene, activated carbon, inorganic nano discs, etc.), 5% Super-P (acetylene black-based conductive additive), and 10% PTFE, which were mixed and coated on Al foil. The thickness of electrode is around 100 μm. With the graphene-HC mixtures, we were able to make electrodes thicker than 600 μm. For each sample, both coin-size and pouch cells were assembled in a glove box. The capacity was measured with galvanostatic experiments using an Arbin SCTS electrochemical testing instrument. Cyclic voltammetry (CV) and electrochemical impedance spectroscopy (EIS) were conducted on an electrochemical workstation (CHI 660 System, USA).

Galvanostatic charge/discharge tests were conducted on the samples to evaluate the electrochemical performance. For the galvanostatic tests, the specific capacity (q) is calculated as $$q = I^* t/m \qquad (1)$$

where I is the constant current in mA, t is the time in hours, and m is the cathode active material mass in grams. With voltage V, the specific energy (E) is calculated as, $$E = \int V dq \qquad (2)$$

The specific power (P) can be calculated as $$P = (E/t)(W/kg) \qquad (3)$$

where t is the total charge or discharge step time in hours.

The specific capacitance (C) of the cell is represented by the slope at each point of the voltage vs. specific capacity plot, $$C = dq/dV \qquad (4)$$

For each sample, several current density (representing charge/discharge rates) were imposed to determine the electrochemical responses, allowing for calculations of energy density and power density values required of the construction of a Ragone plot (power density vs. energy density).

Figure 4:
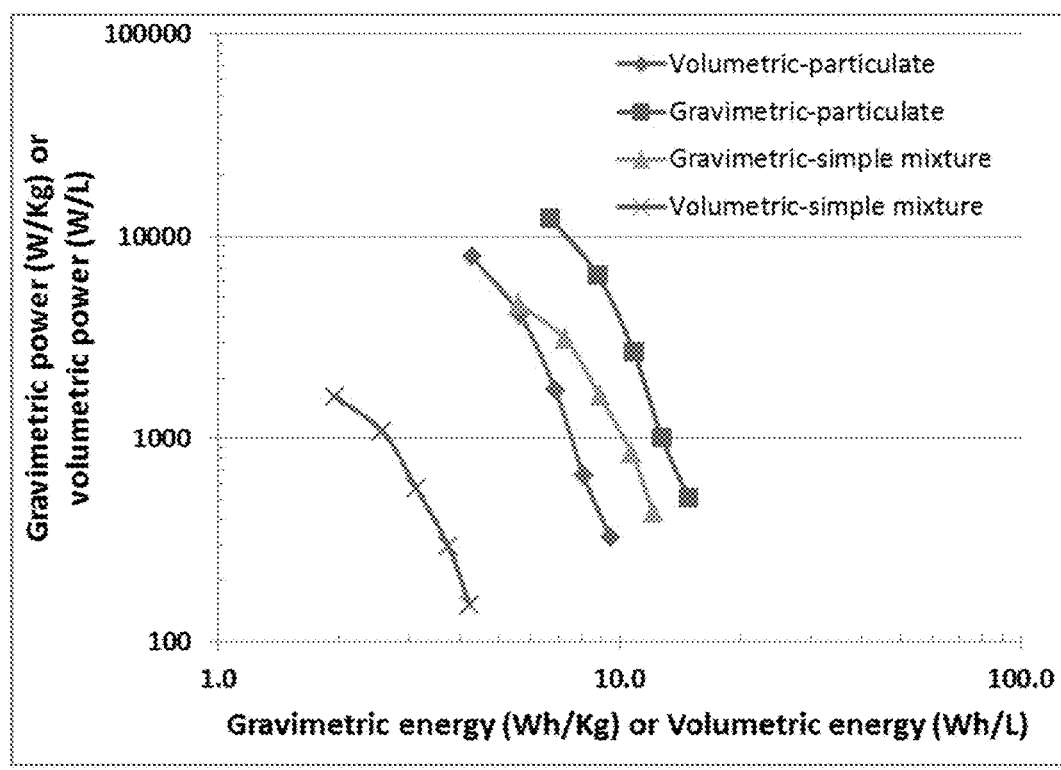
FIG. 4 Ragone plots of 2 series of EDLC supercapacitors featuring graphene/HC particulate based electrodes and simple mixture electrodes, respectively.

Shown in FIG. 4 are Ragone plots (gravimetric and volumetric power density vs. energy density) of two sets of symmetric supercapacitor (EDLC) cells containing reduced graphene oxide (RGO) sheets and RGO-reduced humic acid (RHC) mixture sheets as the electrode active material, separately, and EMIMBF4 ionic liquid as the electrolyte. Several significant observations can be made from these data:

(A) Both the gravimetric and volumetric energy densities and power densities of the supercapacitor cells prepared by the presently invented method (graphene/humic acid mixture particulates) are significantly higher than those of their counterparts prepared via the conventional method (simple mixtures of graphene sheets and humic acid molecules). The differences are highly dramatic and are mainly due to the high active material mass loading (>20 mg/cm$^2$) associated with the presently invented cells, reduced proportion of overhead (non-active) components relative to the active material weight/volume, reduced amount of binder resin, the ability of the inventive method to more effectively pack graphene/HC sheets (higher tap density) to form a compact and thick electrode.

(B) For the cells prepared by the conventional method, the absolute magnitudes of the volumetric energy densities and volumetric power densities are significantly lower than those of their gravimetric energy densities and gravimetric power densities, due to the very low tap density (packing density of 0.35 g/cm$^3$) of simple RGO/RHC mixture-based electrodes prepared by the conventional slurry coating method.

(C) In contrast, for the cells prepared by the presently invented method, the absolute magnitudes of the volumetric energy densities and volumetric power densities are not much lower than those of their gravimetric energy densities and gravimetric power densities, due to the relatively high tap density (packing density of 0.65 g/cm$^3$) of RGO/RHC particulate-based electrodes prepared by the presently invented method.

(D) The particulates can be readily packed and formed into dramatically thicker electrodes. This is a big surprise.

Figure 6:
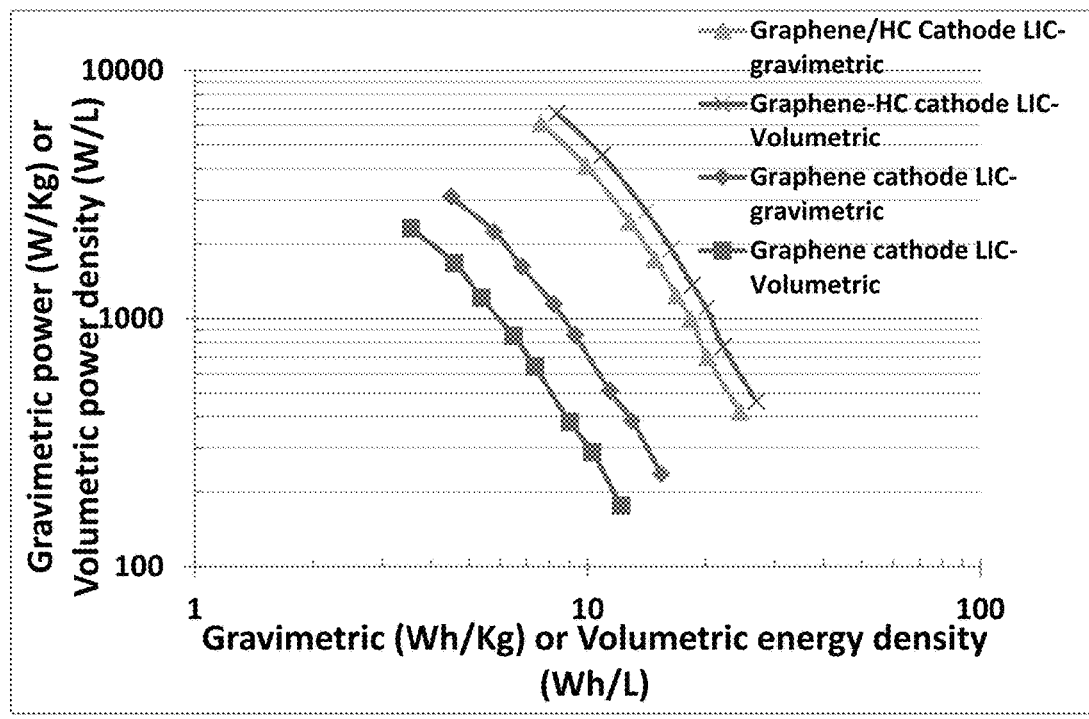
FIG. 6 Ragone plots of 2 series of lithium-ion capacitors featuring graphene/HC particulate based cathode and simple mixture cathode, respectively.

Example 13: Electrochemical Performance of Lithium-Ion Capacitors Having a Graphene/HC- or Graphene-Based Cathode Shown in FIG. 6 are Ragone plots of lithium ion capacitor (LIC) cells containing a cathode of pristine graphene/HC sheets and LICs containing a cathode of graphene sheets alone). In both LIC cells, prelithiated graphite particles are used as the anode active material, and lithium salt (LiPF$_6$)-PC/DEC as the organic liquid electrolyte. These data indicate that both the gravimetric and volumetric energy densities and power densities of the LIC cells containing the graphene/HC Particulate cathode are significantly higher than those of their counterparts containing a graphene cathode (no humic acid). These huge differences may be ascribed to the high active material mass loading (>15 mg/cm$^2$ at the anode side and >25 mg/cm$^2$ at the cathode side) associated with the presently invented cells, significantly higher tap density, reduced amount of binder resin, and higher electrolyte-accessible surface areas.

For the LIC cells prepared by the conventional method, the absolute magnitudes of the volumetric energy densities and volumetric power densities are significantly lower than those of their gravimetric energy densities and gravimetric power densities, due to the very low tap density (packing density of 0.25 g/cm$^3$) of pristine graphene-based cathodes prepared by the conventional slurry coating method. In contrast, for the LIC cells containing a graphene/HC cathode, the absolute magnitudes of the volumetric energy densities and volumetric power densities are higher than those of their gravimetric energy densities and gravimetric power densities, due to the relatively high tap density (1.1 g/cm$^3$) of pristine graphene-based cathodes prepared by the presently invented method.

It is of significance to point out that reporting the energy and power densities per weight of active material alone on a Ragone plot, as did by many researchers, may not give a realistic picture of the performance of the assembled supercapacitor cell. The weights of other device components also must be taken into account. These overhead components, including current collectors, electrolyte, separator, binder, connectors, and packaging, are non-active materials and do not contribute to the charge storage amounts. They only add weights and volumes to the device. Hence, it is desirable to reduce the relative proportion of overhead component weights and increase the active material proportion. However, it has not been possible to achieve this objective using conventional supercapacitor production processes. The present invention overcomes this long-standing, most serious problem in the art of supercapacitors.

In a commercial supercapacitor having an electrode thickness of 150-200 μm, the weight of the active material (i.e. activated carbon) accounts for about 25%-30% of the total mass of the packaged cell. Hence, a factor of 3 to 4 is frequently used to extrapolate the energy or power densities of the device (cell) from the properties based on the active material weight alone. In most of the scientific papers, the properties reported are typically based on the active material weight alone and the electrodes are typically very thin (<<50 μm, and mostly <<20 μm). The active material weight is typically from 5% to 10% of the total device weight, which implies that the actual cell (device) energy or power densities may be obtained by dividing the corresponding active material weight-based values by a factor of 10 to 20. After this factor is taken into account, the properties reported in these papers do not really look any better than those of commercial supercapacitors. Thus, one must be very careful when it comes to read and interpret the performance data of supercapacitors reported in the scientific papers and patent applications.

Quite significantly and unexpectedly, a combination of graphene sheets with humic acid enables the formation of not only particulates of higher tap density but also much thicker electrodes, from 150 μm to >600 μm.

Example 14: Effect of the Humic Acid Amount

Figure 5A:
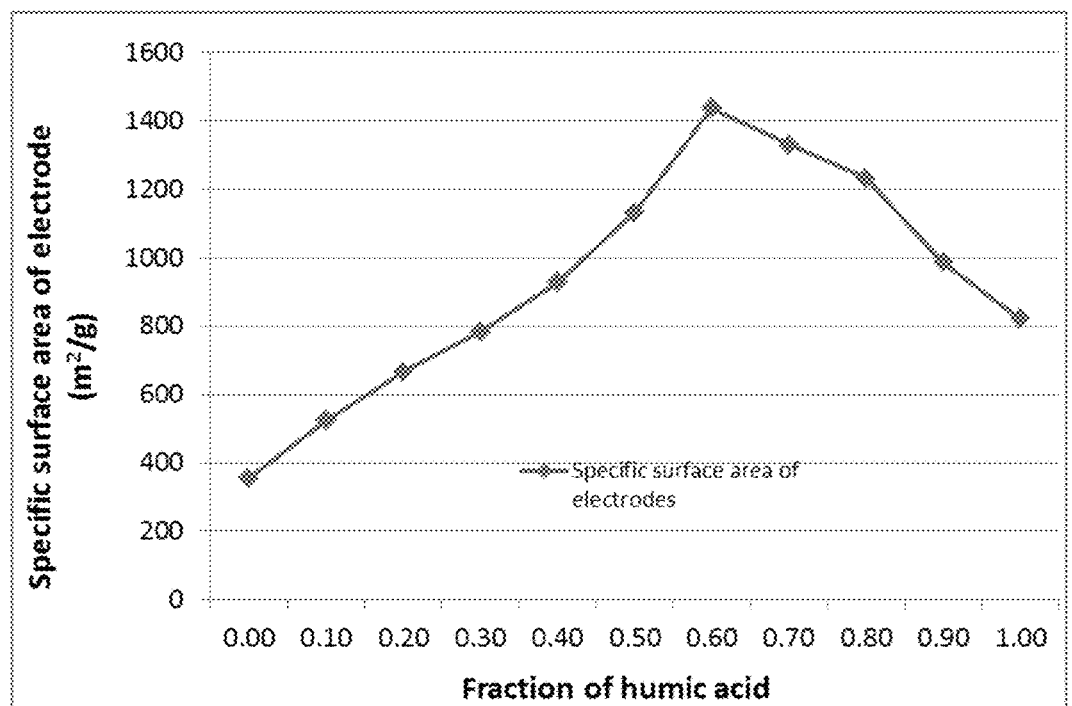
FIG. 5(A) The specific surface areas of electrodes plotted as a function of the fraction of humic acid in a humic acid/graphene mixture electrode.
Figure 5B:
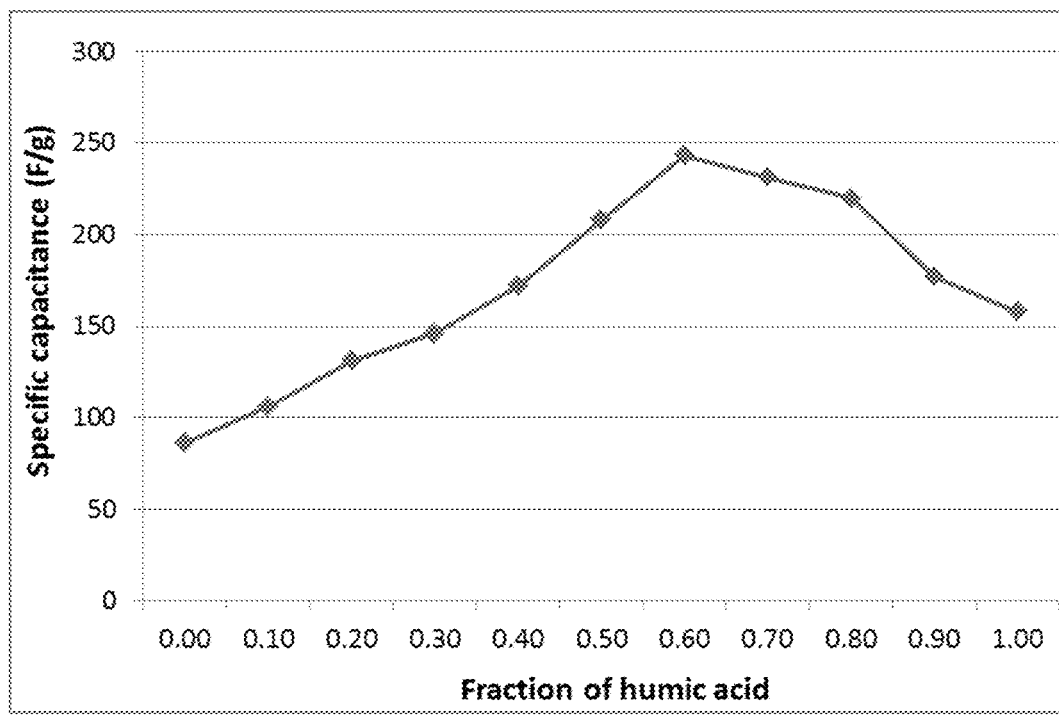
FIG. 5(B) The specific capacitance of electrodes plotted as a function of the fraction of humic acid in a humic acid/graphene mixture electrode.
Figure 5C:
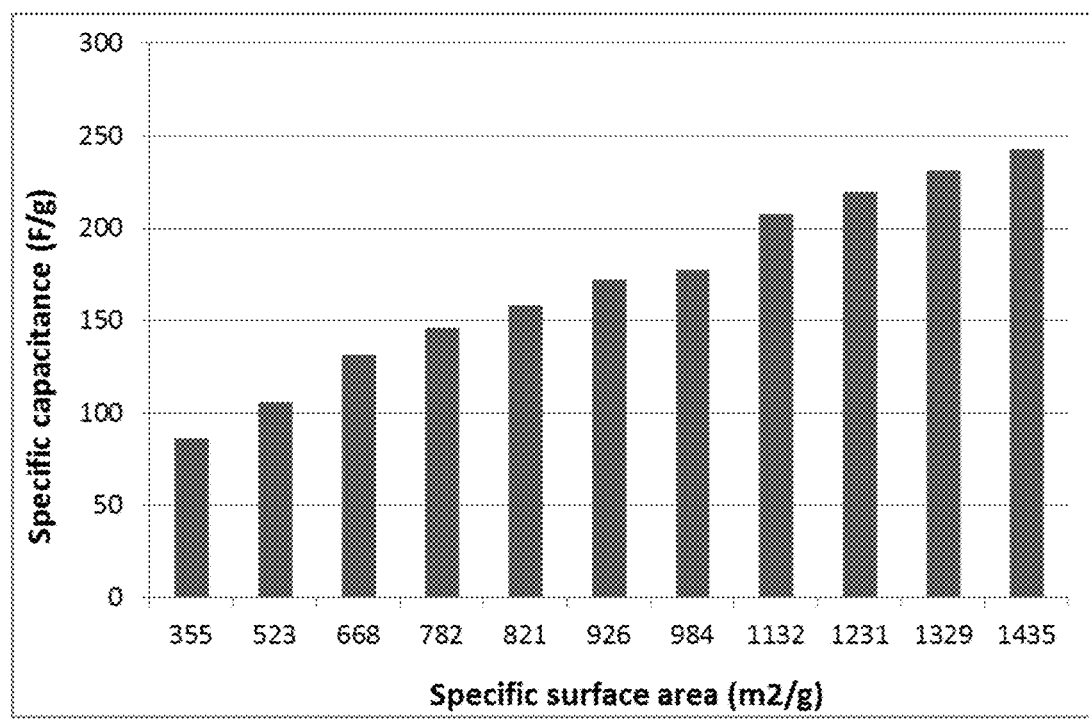
FIG. 5(C) The correlation between the specific surface area and the specific capacitance.

Supercapacitor cells with both electrodes made of graphene/HC particulates were prepared and evaluated. The results were summarized in FIG. 5(A)-FIG. 5(C). FIG. 5(A) and FIG. 5(B) show that the specific surface area of the electrode and the corresponding specific capacitance increase initially with proportion of humic acid, reach a peak at approximately 60% HC, and then begin to decrease after that. This observation implies that there exists an optimum HC content to maximize the specific surface areas accessible by the electrolyte. There is a clear correlation between the specific capacitance and the specific surface area as shown in FIG. 5(C). The specific surface area based on double layer capacitance alone, without a contribution from redox-based pseudo-capacitance, reaches a value of 243 F/g, which is much higher than what could be achieved with carbon nano-tubes and graphene sheets without HC. The presently invented graphene-HC mixture particulate approach enables a supercapacitor designer to take full advantage of the high specific surface area of graphene-based materials by overcoming the most severe technical problem associated with this new class of nano materials for supercapacitor applications (i.e. the tendency to overlap and re-stack with one another and, hence, dramatically reduce the effective surface areas). Humic acid molecules or sheets seem to be capable of preventing re-stacking of graphene sheets.

In conclusion, we have successfully developed a new and novel class of supercapacitors that have unexpectedly thick electrodes (not previously achievable), large active material mass loading (not previously achievable), outstanding gravimetric energy density (not previously achievable), and unprecedentedly high volumetric energy density. These advantages are realized even by using the conventional slurry coating and drying process commonly used in supercapacitor industry provided secondary particles, rather than primary HC/graphene particles (sheets) are used in the slurry. The invented graphene-humic acid mixture overcomes the long-standing problems associated with graphene sheet-based supercapacitors (i.e. inability to make thick electrodes, difficulty in preventing graphene sheet re-stacking, low tap density, and low volumetric energy density).

We claim:

1. A supercapacitor electrode comprising a mixture of graphene sheets and humic acid, wherein said humic acid occupies 0.1% to 99% by weight of the mixture and said graphene sheets are selected from a pristine graphene material having essentially zero % of non-carbon elements, or a non-pristine graphene material having 0.001% to 5% by weight of non-carbon elements wherein said non-pristine graphene is selected from the group consisting of graphene oxide, reduced graphene oxide, graphene fluoride, graphene chloride, graphene bromide, graphene iodide, hydrogenated graphene, nitrogenated graphene, chemically functionalized graphene, and a combination thereof; and wherein said mixture has a specific surface area greater than 500 m$^2$/g.

2. The supercapacitor electrode of claim 1, wherein said electrode comprises multiple particulates that are porous and each particulate is composed of multiple humic acid molecules and graphene sheets that are packed into a spherical or ellipsoidal shape.

3. The supercapacitor electrode of claim 1, wherein said graphene sheets comprise single-layer graphene.

4. The supercapacitor electrode of claim 1, wherein said graphene sheets contain few-layer graphene having an average thickness no greater than 2 nm or no more than 5 graphene planes per sheet.

5. The supercapacitor electrode of claim 1, wherein said humic acid contains isolated single molecules.

6. The supercapacitor electrode of claim 1, wherein said mixture has a specific surface area greater than 1,500 m$^2$/g.

7. The supercapacitor electrode of claim 1, wherein said mixture has a specific surface area greater than 2,000 m$^2$/g.

8. The supercapacitor electrode of claim 1, wherein said graphene sheets or humic acid molecules are functionalized with one or more of conducting polymers, transition metal oxides, or transition metal sulfides.

9. The supercapacitor electrode of claim 1, wherein said graphene sheets are chemically or physically activated.

10. A supercapacitor comprising an anode, a cathode, a porous separator disposed between said anode and said cathode, a liquid electrolyte in ionic contact with said anode and said cathode, wherein at least one of said anode and said cathode contains said supercapacitor electrode of claim 1.

11. The supercapacitor as defined in claim 10, wherein said graphene sheets and/or said humid acid molecules are bonded by or bonded to a conductive binder material selected from the group consisting of a conducting polymer, a polymeric carbon, an amorphous carbon, a petroleum pitch, a coal tar pitch, a meso-phase pitch, and combinations thereof.

12. The supercapacitor as defined in claim 10, wherein said graphene sheets are activated, surface-functionalized, or surface-coated with functional materials or chemical groups for enhanced capacitance.

13. The supercapacitor as defined in claim 10 wherein said graphene sheets are functionalized with one or more conducting polymers, transition metal oxides, or transition metal sulfides.

14. A supercapacitor comprising an anode, a cathode, a porous separator disposed between said anode and said cathode, a liquid electrolyte in ionic contact with said anode and said cathode, wherein at least one of said anode and said cathode contains a supercapacitor electrode comprising a mixture of graphene sheets and humic acid, wherein said humic acid occupies 0.1% to 99% by weight of the mixture and said graphene sheets are selected from a pristine graphene material having essentially zero % of non-carbon elements, or a non-pristine graphene material having 0.001% to 5% by weight of non-carbon elements wherein said non-pristine graphene is selected from the group consisting of graphene oxide, reduced graphene oxide, graphene fluoride, graphene chloride, graphene bromide, graphene iodide, hydrogenated graphene, nitrogenated graphene, chemically functionalized graphene, and a combination thereof and wherein said mixture has a specific surface area greater than 500 $m^2/g$, wherein said anode or cathode further contains a redox pair partner material selected from a metal oxide, a conducting polymer, an organic material, a non-graphene carbon material, an inorganic material, or a combination thereof, wherein said partner material, in combination with graphene sheets or humic acid, forms a redox pair for pseudo-capacitance.

15. The supercapacitor of claim 14, wherein said metal oxide is selected from $RuO_2$, $IrO_2$, NiO, $MnO_2$, $VO_2$, $V_2O_5$, $V_3O_8$, $TiO_2$, $Cr_2O_3$, $Co_2O_3$, $Co_3O_4$, $PbO_2$, $Ag_2O$, or a combination thereof.

16. The supercapacitor of claim 14, wherein said inorganic material is selected from a metal carbide, metal nitride, metal boride, metal dichalcogenide, or a combination thereof.

17. The supercapacitor of claim 14, wherein said metal oxide or inorganic material is selected from an oxide, dichalcogenide, trichalcogenide, sulfide, selenide, or telluride of niobium, zirconium, molybdenum, hafnium, tantalum, tungsten, titanium, vanadium, chromium, cobalt, manganese, iron, or nickel in a nanowire, nano-disc, nano-ribbon, or nano platelet form.

18. The supercapacitor of claim 14, wherein said inorganic material is selected from nano discs, nano platelets, nano-coating, or nano sheets of an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof; wherein said discs, platelets, or sheets have a thickness less than 100 nm.

19. The supercapacitor of claim 10, which is selected from a symmetric supercapacitor, an asymmetric supercapacitor, a redox supercapacitor, a lithium-ion capacitor, or a sodium-ion capacitor.

* * * * *